July 28, 1942.  L. ESCOBAR  2,291,153
EGG CLEANER
Filed July 3, 1941   2 Sheets-Sheet 1
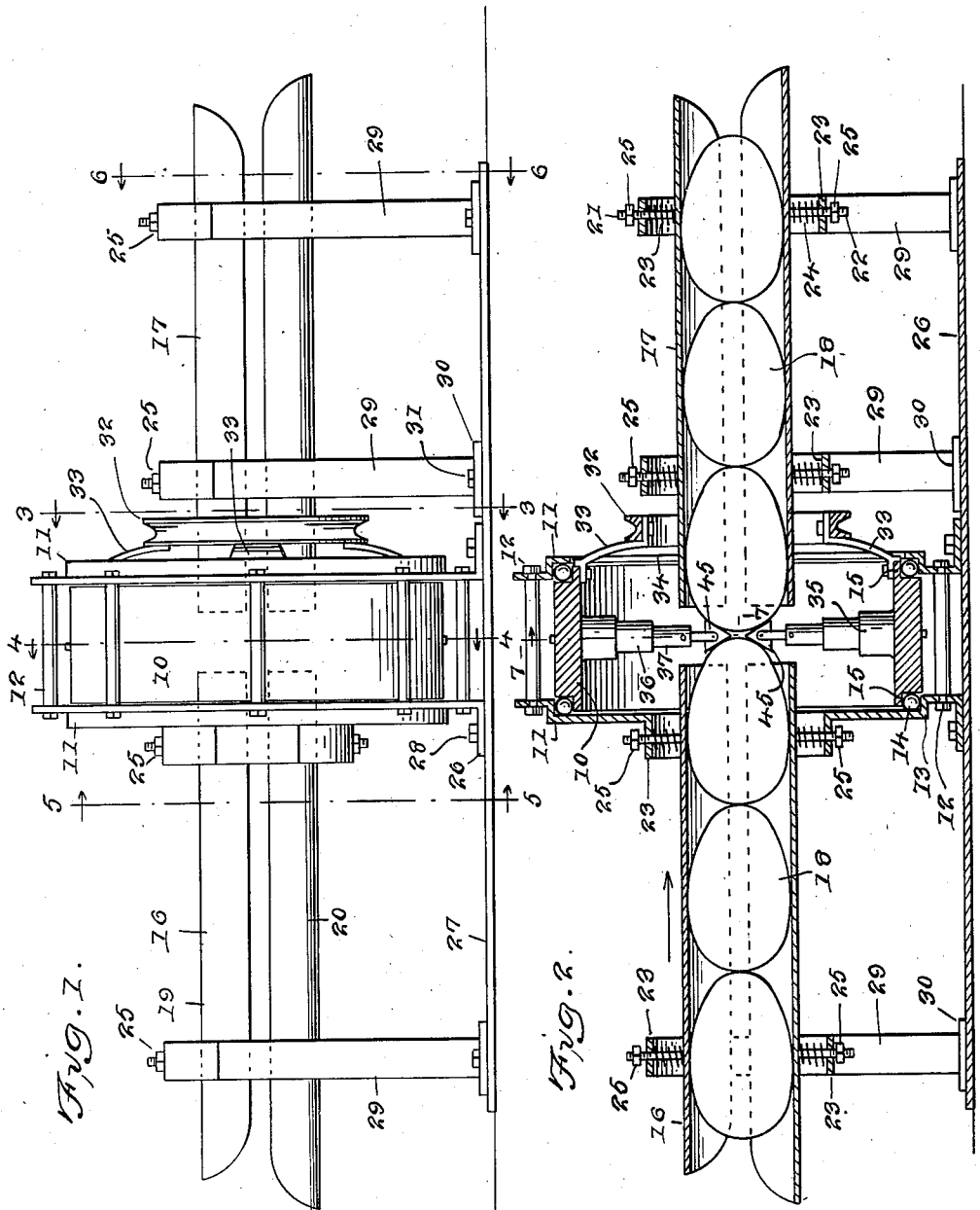
Laurence Escobar
INVENTOR
BY Victor J. Evans & Co.
ATTORNEYS July 28, 1942.  L. ESCOBAR  2,291,153
EGG CLEANER
Filed July 3, 1941   2 Sheets-Sheet 2
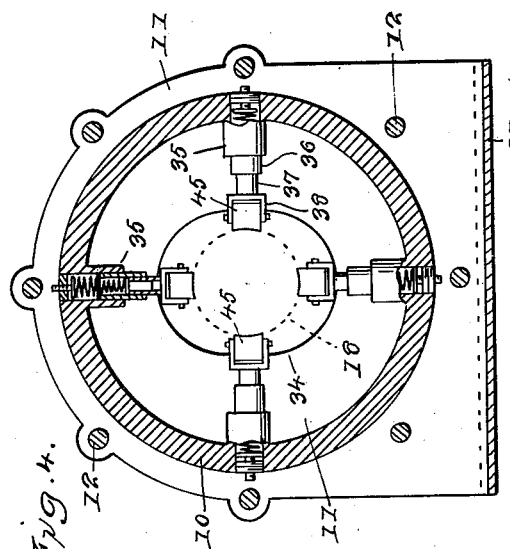
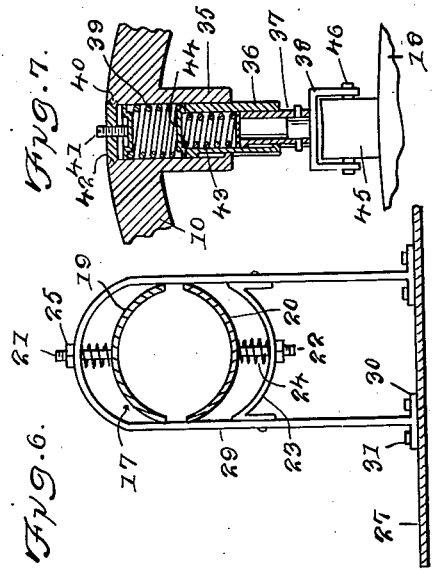
Laurence Escobar
INVENTOR
BY Victor J. Evans & Co.
ATTORNEYS Patented July 28, 1942

2,291,153

UNITED STATES PATENT OFFICE 2,291,153

EGG CLEANER

Laurence Escobar, Salinas, Calif.

Application July 3, 1941, Serial No. 401,025

5 Claims. (Cl. 51—73)

This invention relates to egg cleaners and has for an object to provide a device of this character having guide tubes through which eggs may be fed end to end, there being rotary sanding devices intercepting the eggs as they pass between the inlet tube and discharge tube for effectively removing all stains and blemishes in a minimum time.

A further object is to provide a device of this character in which the eggs may be fed to and removed from the tubes by a single operator, the device being so constructed as to be easily disassembled for cleaning by the same operator.

A further object is to provide a device of this character having removable pivoted sanders which automatically pivot to follow the contour of the egg in a substantially spiral path so that all portions of the egg are effectively scoured clean, the sanders being easily removed and replaced when worn.

A further object is to provide apparatus of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a front elevation of an egg cleaner constructed in accordance with the invention.

Figure 2 is a longitudinal sectional view of the egg cleaner showing the sanders passing off from a cleaned egg and intercepting an egg to be cleaned.

Figure 3 is a cross sectional view of the egg cleaner taken on the line 3—3 of Figure 1, with portions broken away.

Figure 4 is a cross sectional view of the egg cleaner taken on the line 4—4 of Figure 1, showing the spring pressed telescoping stems of the sanders.

Figure 5 is a cross sectional view of the egg cleaner taken on the line 5—5 of Figure 1, showing one of the guide tubes formed of spring pressed sections to frictionally engage the eggs.

Figure 6 is a cross sectional view taken on the line 6—6 of Figure 1 showing the discharge end of the egg cleaner.

Figure 7 is an enlarged detail sectional view taken on the line 7—7 of Figure 1.

Figures 8, 9 and 10 are diagrammatic views showing three different positions of a sander on an egg passing through the guide tubes.

Referring now to the drawings in which like characters of reference designate similar parts in the various views, the egg cleaner comprises a drum 10 disposed on a horizontal axis of rotation between spaced frame plates 11 which are secured together by an annular series of bolts 12, see Figures 4 and 5. The frame plates are provided with annular ball recesses 13 to receive bearing balls 14 upon which flanges 15 of the drum are supported to secure the drum for antifriction rotation in the frame formed by the frame plates and bolts.

A pair of guide tubes 16 and 17 are disposed in axial alignment with the drum 10, the inner ends of the tubes being spaced apart at the center of the drum. The tubes form a passageway for the eggs to be cleaned, the tube 16 on the left of the device being an inlet tube through which the eggs 18 are fed end to end manually through the tube, and the tube 17 on the right of the device forming an outlet tube which receives the eggs after the same are sanded and from which the eggs are discharged manually by pressure of one egg against the other from the left to the right of the device so that a single operator may operate the device.

Each tube is preferably formed of two vertically spaced sections 19 and 20, see Figure 5. The sections are carried respectively by stems 21 and 22 which extend through a respective supporting ring 23. Helical springs 24 are sleeved on the stems outside the sections of the tube and bear against the ring underneath nuts 25 which are threaded onto the stems and are manipulated to adjust the tension of the springs. The sections of the tube lightly frictionally engage the eggs during their passage through both tubes.

The frame plates are provided with base lugs 26 which are bolted to a base plate 27, as shown at 28 in Figure 1. Two of the aforesaid supporting rings 23 are carried by inverted U-shaped standards 29 having feet 30 which are bolted to the base plate 27, as shown at 31. Three of the standards are used, two of which carry the rings 23 which support the discharge tube 17, and the other one carrying the ring 23 which supports the inlet end of the inlet tube 16. For the sake of compactness, the ring 23 which supports the outlet end of the inlet tube 16 is formed integral with one of the frame plates 11 of the frame, see Figures 1, 2 and 3.

The drum is rotated through the medium of a pulley 32 which is secured by brackets 33 to the drum, which project through a large circular opening 34 in that frame plate of the drum which receives the inlet end of the discharge tube 17, see Figure 2. The pulley may be connected to any suitable source of power by a belt drive, not shown.

The drum is provided with a plurality of radially disposed socket members 35, see Figures 4 and 7, which slidably receive the stems of sanders. Each sander stem comprises two telescopically assembled sections 36 and 37 one of which is provided with a sander supporting yoke 38 and the other of which is slidably received in the socket member 35. There are preferably four of the sander stems arranged at an angular advance of 90° apart around the interior of the drum and extending radially toward the space between the confronting inner ends of the tubes 16 and 17, see Figures 2 and 4.

The sections of each stem are spring pressed, the inner section 36 being urged by a spring 39 disposed in the socket member 35, and regulated as to tension by a plunger 40 having a stem 41 which threadedly engages a closure 42 for the outer end of the socket member. The other section 37 of each stem is urged by a spring 43 which bears against the inner end of the section and abuts a separating washer 44 disposed between both of the springs.

Each sander 45 is substantially triangular in cross section and presents substantially rectangular sanding surfaces which may be slightly concave, if desired, as shown in Figure 7. The sanders may be formed of moulded sand held together by adhesive, or may be made of wood faced with emery or sandpaper, as desired. In either case a pivot pin 46 is engaged through the branches of the respective yoke 38 and through an axial opening in the sander to pivotally mount the sander on the yoke so that it may present its sanding faces to the surface of the egg from end to end of the egg in a spiral path as the egg progresses longitudinally from the inlet tube to the outlet tube, as shown diagrammatically in Figures 8 to 10 inclusive. Each sander may be replaced when worn, by simply knocking out the pivot pin 46 and substituting a new sander.

In operation, the drum is rotated at any desired speed. The operator then feeds eggs with the left hand into the inlet tube 16 end to end. As the eggs emerge successively from the outlet end of the tube they are intercepted by the four or more sanders 45. As each egg is forced manually from the inlet tube 16 by pressure from the operator's hand against the final egg of the series, the sanders will wipe a spiral path from one end of the egg to the other end of the egg as the egg progresses into the inlet end of the discharge tube 17 and thoroughly scour stains from the surface of the egg. Each egg being scoured will engage the previously scoured egg in the discharge tube 17 soon after the sanders 45 begin to operate and supply pressure to the cleaned eggs in the discharge tube for discharging them into the operator's right hand or other receptacle.

From the above description it is thought that the construction and operation of the invention will be fully understood without further explanation.

What is claimed is:

1. An egg cleaner comprising a rotatable drum, receiving and discharging tubes coaxial with the drum adapted to guide eggs end to end in a rectilinear direction through the drum, said tubes having their inner ends spaced apart at the center of the drum, means for rotating the drum, and a spring pressed pivotally mounted abrasive sander carried by the drum adapted to intercept the eggs successively between the inner ends of the tubes and scour the surface of each egg in a spiral path.

2. The structure as of claim 1 and in which the sander is substantially triangular in cross section and is mounted to turn on an axis of rotation extending transversely of the path of travel of the eggs to present substantially rectangular scouring faces to the surface of an egg travelling underneath the sander.

3. The structure as of claim 1 and in which each of said tubes is formed of spring pressed sections adapted to frictionally engage the eggs while the eggs are being fed by pressure exerted from the intake end of the receiving tube and transmitted to the eggs by endwise pressure of each egg against the next preceding egg.

4. An egg cleaner comprising a rotatable drum, egg receiving and discharging tubes mounted at opposite sides of the drum having their inner ends spaced apart at the center of the drum, means for rotating the drum, a spring pressed telescoping tube extending radially from the drum toward the confronting inner ends of the tubes, and an abrasive sander pivotally mounted on the inner end of the telescoping tube adapted to intercept an egg between the inner ends of the tubes and scour the surface of the egg in a spiral path.

5. An egg cleaner comprising a rotatable drum, egg receiving and discharging tubes mounted at opposite sides of the drum having their inner ends spaced apart at the center of the drum, means for rotating the drum, a spring pressed telescoping tube extending radially from the drum toward the confronting inner ends of the tubes, a yoke carried by the inner end of the telescoping tube, a pivot pin engaged through the branches of the yoke, and a sander substantially triangular in cross section mounted to turn on the pivot pin and having substantially rectangular scouring faces for scouring the surface of an egg in a spiral path as the egg passes from the receiving tube into the discharging tube.

LAURENCE ESCOBAR.